United States Patent
Choi (10) Patent No.: US 11,599,540 B2
(45) Date of Patent: *Mar. 7, 2023

(54) QUERY EXECUTION APPARATUS, METHOD, AND SYSTEM FOR PROCESSING DATA, QUERY CONTAINING A COMPOSITE PRIMITIVE

(71) Applicant: COUPANG CORP., Seoul (KR)

(72) Inventor: Hyunsik Choi, Seoul (KR)

(73) Assignee: Coupang Corp., Seoul (KR)

( * ) Notice: Subject to any disclaimer, the term of this patent is extended or adjusted under 35 U.S.C. 154(b) by 44 days.

This patent is subject to a terminal disclaimer.

(21) Appl. No.: 16/912,171

(22) Filed: Jun. 25, 2020

(65) Prior Publication Data

US 2020/0327128 A1 Oct. 15, 2020

Related U.S. Application Data (63) Continuation of application No. 14/453,667, filed on Aug. 7, 2014, now Pat. No. 10,740,331.

(30) Foreign Application Priority Data

Aug. 7, 2014 (KR) .................. 10-2014-0101735

(51) Int. Cl.
*G06F 16/2453* (2019.01)
*G06F 16/2455* (2019.01)
*G06F 9/44* (2018.01)

(52) U.S. Cl.
CPC .......... *G06F 16/24542* (2019.01); *G06F 9/44* (2013.01); *G06F 16/2455* (2019.01)

(58) Field of Classification Search
CPC .................. G06F 16/24542; G06F 16/2455
(Continued)

(56) References Cited

U.S. PATENT DOCUMENTS 5,325,525 A    6/1994   Shan et al.
5,544,355 A * 8/1996   Chaudhuri ........ G06F 16/24542
(Continued)

FOREIGN PATENT DOCUMENTS

KR     10-1085639      11/2011
KR     2015-0046659    4/2015

OTHER PUBLICATIONS

Choi, Hyunsik, "Introduction to Tajo (Tajo: A Distributed Data Warehouse System for Hadoop)", http://www.slideshare.net/hyunsikchol/tajo-intro, Feb. 24, 2013. (29 pages).

*Primary Examiner* — Tony Mahmoudi
*Assistant Examiner* — Michael Le
(74) *Attorney, Agent, or Firm* — Finnegan, Henderson, Farabow, Garrett & Dunner LLP (57) ABSTRACT

Embodiment of the present disclosure include an apparatus and method for executing a query, and a system for processing data by using the same. In some embodiments an apparatus for executing a query includes a processor receiving a query and returning a result value. The apparatus may further comprise a storage storing data on the query. The storage of the apparatus may include a first storage temporarily storing data required for the execution of the query. The storage may further include second storage constructing a DB and storing data, wherein the processor combines a plurality of primitives in the query to configure a composite primitive, generates a binary code for the composite primitive in run time, and executes a generated code.

19 Claims, 9 Drawing Sheets

(58) Field of Classification Search
USPC .......................................................... 707/718
See application file for complete search history.

(56) References Cited

U.S. PATENT DOCUMENTS

| | | | |
|---|---|---|---|
| 5,590,324 A * | 12/1996 | Leung | G06F 16/24537 |
| | | | 707/999.005 |
| 5,742,806 A | 4/1998 | Reiner et al. | |
| 5,819,255 A * | 10/1998 | Celis | G06F 16/24542 |
| 5,822,747 A * | 10/1998 | Graefe | G06F 16/24542 |
| 5,899,986 A | 5/1999 | Ziauddin | |
| 6,026,390 A | 2/2000 | Ross et al. | |
| 6,081,804 A | 6/2000 | Smith | |
| 6,205,441 B1 * | 3/2001 | Al-omari | G06F 16/24537 |
| 6,212,514 B1 | 4/2001 | Eberhard et al. | |
| 6,263,345 B1 | 7/2001 | Farrar et al. | |
| 6,748,392 B1 | 6/2004 | Galindo-Legaria et al. | |
| 6,865,567 B1 * | 3/2005 | Oommen | G06F 16/24542 |
| 7,058,622 B1 | 6/2006 | Tedesco | |
| 7,984,043 B1 * | 7/2011 | Waas | G06F 16/8358 |
| | | | 707/718 |
| 9,183,254 B1 * | 11/2015 | Cole | G06F 16/2282 |
| 2003/0093415 A1 | 5/2003 | Larson et al. | |
| 2003/0158842 A1 | 8/2003 | Levy et al. | |
| 2005/0240624 A1 | 10/2005 | Ge et al. | |
| 2006/0195425 A1 * | 8/2006 | Deem | G06F 16/2428 |
| 2008/0147627 A1 * | 6/2008 | Natkovich | G06F 16/2454 |
| | | | 707/E17.05 |
| 2009/0077001 A1 * | 3/2009 | Macready | G06N 5/02 |
| | | | 706/57 |
| 2010/0131490 A1 * | 5/2010 | Lamb | G06F 16/24542 |
| | | | 707/719 |
| 2011/0311999 A1 | 12/2011 | Konthur et al. | |
| 2012/0047180 A1 | 2/2012 | Kirshenbaum | |
| 2012/0173515 A1 * | 7/2012 | Jeong | G06F 16/24542 |
| | | | 707/765 |
| 2013/0151491 A1 * | 6/2013 | Gislason | G06F 16/2282 |
| | | | 707/696 |
| 2014/0317085 A1 * | 10/2014 | Wehrmeister | G06F 16/24544 |
| | | | 707/714 |
| 2015/0058316 A1 * | 2/2015 | Bruno | G06F 16/2453 |
| | | | 707/718 |
| 2015/0112965 A1 * | 4/2015 | Tokuda | G06F 16/24553 |
| | | | 707/718 |
| 2015/0234895 A1 * | 8/2015 | Erdogan | G06F 16/24542 |
| | | | 707/714 |
| 2015/0356141 A1 * | 12/2015 | Yan | G06F 16/284 |
| | | | 707/718 |
| 2017/0031967 A1 | 2/2017 | Chavan et al. | |

* cited by examiner

FIG. 4 column

| model | make | price |
|-------|------|-------|
| Boxter | Porsche | 17992 |
| XJ | Jaguar | 15995 |
| Escalade | Cadillac | 40215 | row

↑ Vector 1   ↑ Vector 2   ↑ Vector 3

FIG. 5

Expression : sum(l_extendedprice*(1-l_discount)*(1+l_tax))

Sub Expression 1 : sum(l_extendedprice*(1-l_discount)*(1+l_tax))
Sub Expression 2 : l_extendedprice*(1-l_discount)*(1+l_tax)
Sub Expression 3 : l_extendedprice*(1-l_discount)
Sub Expression 4 : (1-l_discount)*(1+l_tax)
Sub Expression 5 : 1+l_tax
Sub Expression 6 : l_tax
Sub Expression 7 : 1-l_discount
Sub Expression 8 : l_discount

FIG. 6

```
              select
Expression 1 → l_returnflag,
Expression 2 → l_linestatus,
Expression 3 → sum(l_quantity) as sum_qty,
Expression 4 → sum(l_extendedprice) as sum_base_price
Expression 5 → sum(l_extendedprice*(1-l_discount)) as sum_disc_price,
Expression 6 → sum(l_extendedprice*(1-l_discount)*(1+l_tax)) as sum_charge
              from
                lineitem
```

| Sub Expression | Number of Operators | Number of Columns Used |
|---|---|---|
| l_price*l_discount | 1 | 2 |
| (1-l_discount)*l_quantity | 2 | 2 |

FIG. 9

Optimal set of sub expressions of expressions m and n

| Set of Sub Expressions | Number of Operators | Number of Columns Used | |
|---|---|---|---|
| {i, l} | 7 | 3 | |
| {e, f, i, l} | 4 | 2 | ← Lowest Price |

QUERY EXECUTION APPARATUS, METHOD, AND SYSTEM FOR PROCESSING DATA, QUERY CONTAINING A COMPOSITE PRIMITIVE

CROSS-REFERENCE TO RELATED APPLICATIONS

This application is a continuation of U.S. non-provisional patent application Ser. No. 14/453,667, which claims priority under 35 U. S. C § 119 of Korean Patent Application No. 10-2014-0101735, filed on Aug. 7, 2014, the entire contents of each of which is hereby incorporated by reference.

BACKGROUND OF THE INVENTION

The present invention disclosed herein relates to an apparatus and method for executing a query, and a system for processing data by using the same.

In order to integrate information and promote efficient processing, a DB that maintains a set of data having relevance and no redundancy has been used. In particular, a relational DB is a set of data items including a series of tables having a fixed form and has an advantage in that it is easy to use and expand since data may be accessed or combined by using various methods even if DB tables are not re-configured. Such a relational DB provides the time-series accumulation and integration of data to be capable of supporting efficient decision-making in a company.

Recently, since a society has rapidly developed and a change speed is also very fast, the amount of data to be reflected to company's decision-making has also increased rapidly. Thus, there is a strong need for a massive data processing system that may efficiently store and manage massive data and rapidly process a query requested by a user.

SUMMARY OF THE INVENTION

The present invention provides an apparatus and method for executing a query, and a system for processing data by using the same that may respond to a query entered from a client to increase a data processing speed.

The present invention also provides an apparatus and method for executing a query, and a system for processing data by using the same that may increase the utilization of the function of hardware including a CPU or a cache when executing a query.

Embodiments of the present invention provide apparatuses for executing a query including: a processor receiving a query and returning a result value; and a storage storing data on the query, wherein the storage includes: a first storage temporarily storing data required for the execution of the query; and a second storage constructing a DB and storing data, and wherein the processor combines a plurality of primitives in the query to configure a composite primitive, generates a binary code for the composite primitive in run time, and executes a generated code.

In some embodiments, the composite primitive may include: primitives including operators; and operands operated by the operators, wherein the operands may include vectors corresponding to columns in a table that configures the DB.

In other embodiments, the processor may be configured to: obtain, based on at least one expression in a query, sub expressions configuring the expression, generate a plurality of sets of sub expressions required for completing the expression based on the sub expressions, determine, among the plurality of sets of sub expressions, a set of sub expressions having the lowest cost that is calculated based on at least one of computation amount of sub expressions in the sets and the maximum number of columns used for operations, and configure each sub expression in a determined set of sub expressions as the composite primitive.

In still other embodiments, the sub expression may include: operands corresponding to the columns among operands in the expression; and a combination of the operands and operators operating the operands.

In even other embodiments, the processor may generate the component data of sub expressions of the expression based on: identifiers for sub expressions configuring the expression; identifiers for other sub expressions in each sub expression; and the frequency with which each sub expression is represented in the expression.

In yet other embodiments, the processor may generate expression component data representing the inclusion relation between sub expressions configuring the expression based on the component data.

In further embodiments, the processor may be configured to: obtain, for each set of sub expressions, the total number of operators in sub expressions configuring a corresponding set and calculate the computation amount of sub expressions in the corresponding set, and obtain, for each set of sub expressions, the number of operands corresponding to the column that each sub expression in a corresponding set has, and calculate, the maximum number of operands corresponding to the column for each sub expression, as the maximum number of columns used for operations of the corresponding set.

In still further embodiments, the processor may be configured to: select a set of sub expressions having the lowest computation amount among the plurality of sets of sub expressions and select a set of sub expressions having the lowest maximum number of columns used for the operation, when a plurality of sets of sub expressions having the lowest computation amount is selected.

In even further embodiments, the processor may handle columns corresponding to a plurality of operands as one vector and retrieves the columns to the first storage together when the query is executed, if the sub expression configured as the composite primitive has the plurality of operands corresponding to the columns.

In yet further embodiments, the first storage may include at least one of a register, a cache, and a RAM, and the second storage may include at least one of a hard disk drive (HDD) and a solid state drive (SSD).

In other embodiments of the present invention, methods of executing a query by a query execution apparatus including a processor and a storage includes: combining a plurality of primitives in the query to configure a composite primitive; and generating a binary code for the composite primitive in run time and executing a generated code.

In some embodiments, the composite primitive may include: primitives including operators; and operands operated by the operators, wherein the operands may include vectors corresponding to columns in a table that configures a DB built in the storage.

In other embodiments, the configuring of the composite primitive may include: obtaining, based on at least one expression in a query, sub expressions configuring the expression; generating a plurality of sets of sub expressions required for completing the expression based on the sub expressions; determining, among the plurality of sets of sub expressions, a set of sub expressions having the lowest cost that is calculated based on at least one of computation amount of sub expressions in the sets and the maximum number of columns used for operations; and configuring each sub expression in a determined set of sub expressions as the composite primitive.

In still other embodiments, the sub expression may include: operands corresponding to the columns among operands in the expression; and a combination of the operands and operators operating the operands.

In even other embodiments, the generating of the plurality of sets of sub expressions may include generating component data for the sub expressions of the expression based on: identifiers for sub expressions configuring the expression; identifiers for other sub expressions in each sub expression; and the frequency with which each sub expression is represented in the expression.

In yet other embodiments, the generating of the plurality of sets of sub expressions may include generating expression component data representing the inclusion relation between sub expressions configuring the expression based on the component data.

In further embodiments, the determining of the set of sub expressions having the lowest cost may include:

obtaining, for each set of sub expressions, the total number of operators in sub expressions configuring a corresponding set and calculating the computation amount of sub expressions in the corresponding set; obtaining, for each set of sub expressions, the number of operands corresponding to the column that each sub expression in a corresponding set has; and calculating, the maximum number of operands corresponding to the column for each sub expression, as the maximum number of columns used for operations of the corresponding set.

In still further embodiments, the determining of the set of sub expressions having the lowest cost may include: selecting a set of sub expressions having the lowest computation amount among the plurality of sets of sub expressions; and selecting a set of sub expressions having the lowest maximum number of columns used for the operation, when a plurality of sets of sub expressions having the lowest computation amount are selected.

In even further embodiments, the methods may further include, subsequent to configuring the composite primitive, handling columns corresponding to a plurality of operands as one vector and taking the columns together to at least one of a register, a cache and a RAM when the query is executed, if the sub expressions configured as the composite primitive has the plurality of operands corresponding to the columns.

In still other embodiments of the present invention, systems for processing data by using distributed computing include: a primary master module receiving a query from a client and forming a plan to execute the query; a query master module allocating a worker module to execute the query according to the plan to execute, controlling a process of executing the query, and providing the client with a result of executing the query delivered from the worker module; and a plurality of worker modules obtaining and executing the query from the query master and delivering the result of executing the query to the query master, wherein the worker module includes: a processor receiving and executing a query and returning a result value; and a storage storing data on the query, wherein the storage includes: a first storage temporarily storing data required for the execution of the query; and a second storage constructing a DB and storing data, wherein the processor is configured to: combine a plurality of primitives in the query to configure a composite primitive, generate a binary code for the composite primitive in run time, and executes a generated code.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Other advantages and features of the present invention, and implementation methods thereof will be clarified through following embodiments to be described in detail with reference to the accompanying drawings. The present invention may, however, be embodied in different forms and should not be construed as limited to the embodiments set forth herein. Rather, these embodiments are provided so that this disclosure is thorough and complete and fully conveys the scope of the present invention to a person skilled in the art to which the present invention pertains. Further, the present invention is only defined by scopes of claims.

Even if not defined, all the terms used herein (including technology or science terms) have the same meanings as those generally accepted by typical technologies in the related art to which the present invention pertains. The terms defined in general dictionaries may be construed as having the same meanings as those used in the related art and/or a text of the present application and even when some terms are not clearly defined, they should not be construed as being conceptual or excessively formal.

The terms used herein are only for explaining embodiments and not intended to limit the present invention. The terms in a singular form in the disclosure may also include plural forms unless otherwise specified. The terms used herein "includes", "comprises", "including" and/or "comprising" do not exclude the presence or addition of one or more compositions, ingredients, components, steps, operations and/or elements other than the compositions, ingredients, components, steps, operations and/or elements that are mentioned. In the present disclosure, the term "and/or" indicates each of enumerated components or various combinations thereof.

The term "unit", "device", "block", or "module" used herein may mean a unit for processing at least one function or operation. For example, it may mean software or a hardware component such as an FPGA or an ASIC. However, the term "unit", "device" "block", or "module" is not limited to software or hardware. The term "unit", "device", "block" or "module" may also be configured in an addressable storage medium or may also be configured to operate one or more processors.

Thus, as an example, the "unit", "device", "block" or "module" includes components such as software components, object-oriented software components, class components, and task components; processes, functions, attributes, procedures, sub routines, program code segments, drivers, firmware, micro codes, circuits, data, DBs, data structures, tables, arrays and variables. Components and functions provided in the "unit", "device" "block" or "module" may be integrated to be a smaller number of components and a smaller number of units, blocks, or modules or may be further divided into further components and further units, groups, or modules.

Various embodiments of the present invention are described below in detail with reference to the accompanying drawings.

Figure 1:
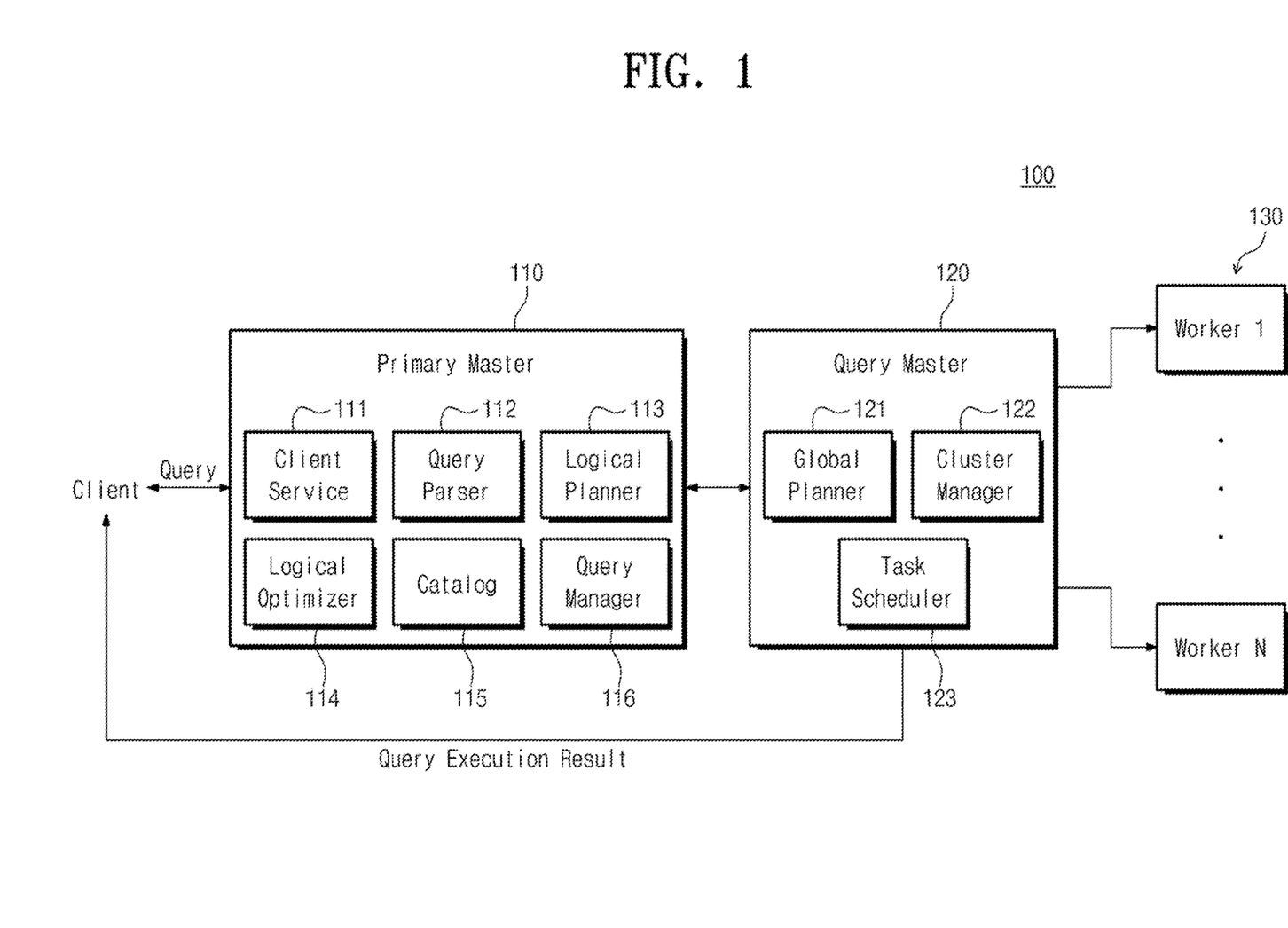
FIG. 1 is an exemplary block diagram of a data processing system according to an embodiment of the present invention.

FIG. 1 is an exemplary block diagram of a data processing device 100 according to an embodiment of the present invention.

As shown in FIG. 1, the data processing system 100 according to an embodiment of the present invention is a system that processes data by using distributed computing and may include a primary master module 110, a query master module 120, and a plurality of worker modules 130.

The primary master module 110 may receive a query from a client and form a plan to execute the query. The query master module 120 may allocate the worker module 130 to execute the query according to the plan to execute, control the execution process of the query, and provide the client with a query execution result received from the worker module 130. The worker module 130 may obtain the query from the query master module 120, execute an obtained query and deliver the query execution result to the query master module 120.

Firstly, the primary master module 110 may receive a query from a client, form a plan to execute the query through query parsing and optimization processes, and execute the query master module 120 according to the plan to execute.

As shown in FIG. 1, the primary master module 110 according to an embodiment of the present invention may include a client service unit 111, a query parser unit 112, a logical planner unit 113, a logical optimizer unit 114, a catalog unit 115, and a query manager unit 116.

The client service unit 111 may provide a service that enables a client to enter a query. According to an example, the service may be provided by using an application service interface (API).

The query parser unit 112 may parse the query entered by the user and convert the query into a relational-algebra data structure. According to an embodiment of the present invention, the query may be formed with a structured query language (SQL) and the query parser unit 112 may parse an SQL query.

The logical planner unit 113 may add the schema of a table and physical information on the table to the relational-algebra data structure generated by the query parser unit 112.

The logical optimizer unit 114 may use an algebraic characteristic to convert, the relational-algebra data structure to which various pieces of information are added by the logical planner unit 113, into various types satisfying an equivalence characteristic, and find an algebraic expression having the lowest cost therefrom.

The catalog unit 115 may manage the schema of each table, statistical information on each table, physical information on each table such as a file path, and partition information on each table.

The query manager unit 116 may manage the state of the query master module 120 and control a process of progress.

Next, the query master module 120 may allocate the worker module 130 to execute the query according to the plan to execute the query formed by the primary master module 110, and perform task scheduling. According to an embodiment, in the case of a query including a plurality of steps, the query master module 120 may also control a process of progress of that query. In addition, the query master module 120 may receive and summarize a report on query execution from the worker module 130, collect statistical information and report the primary master module 110.

As shown in FIG. 1, the query master module 120 according to an embodiment of the present invention may include a global planner unit 121, a cluster manager unit 122, and a task scheduler unit 123.

The global planner unit 121 may manage a distributed execution plan for a query utilizing a plurality of worker modules 130 and control a process of execution of the query.

The cluster manager unit 122 may allocate a resource related to query execution to a cluster node and manage the worker modules 130.

The task scheduler 123 may schedule a plurality of tasks for the worker module 130 in operation.

Next, the worker modules 130 may obtain a query from the query master module 120, execute an obtained query and deliver a query execution result to the query master module 120. That is, the worker module 130 is a part that actually processes data in the data processing system.

Also, the worker module 130 may read and process data from a storage according to a query to be executed, and according to a processing result, the worker module 130 store processed data in the storage or deliver it to the query master module so that the query execution result is eventually delivered to a client.

Although not shown in FIG. 1, the worker module 130 may include a storage manager unit and a local query engine unit.

The storage manager unit may provide an interface so that the local query engine unit may process data from various data sources such as a local file system, a hadoop distributed file system (HDFS), and Hbase through the same interface.

The local query engine unit may process data tuple read from a storage through the storage manager unit. In addition, the local query engine unit may generate and execute an algorithm for data processing within a corresponding execution time according to a logical execution plan received from the query master module 120.

Figure 2:
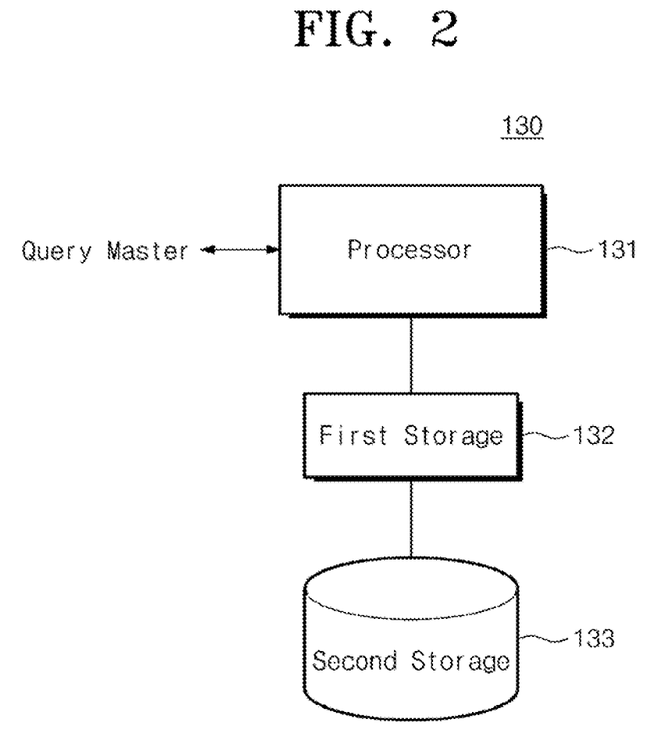
FIG. 2 is a schematic block diagram of a worker module according to an embodiment of the present invention.

FIG. 2 is a schematic block diagram of a worker module 130 according to an embodiment of the present invention.

According to the above description, the worker module 130 may logically include a storage manager unit and a local query engine unit but physically include a processor 131 and storages 131 and 132.

The processor 131 is hardware that receives and executes a query and returns a result value, and a CPU may be used for example.

The storage may store data on the query. The storage may include a first storage 132 and a second storage 133. The first storage 132 is a memory device that temporarily stores data required for the execution of a query and may include at least one of a register, a cache and a RAM, for example. The second storage 133 is a storage device that constructs a DB and stores data, and may include at least one of a hard disk drive (HDD) and a solid state drive (SSD), for example.

The processor 131 may call data required for the execution of the query from the second storage 133 when executing the query, store the data in the first storage 132 and access the data. Since the first storage 132 has less memory capacity than the second storage 133 but a faster operation speed, it is possible to increase the processing speed of a device while the first storage 132 is between the processor 131 and the second storage 133.

According to an embodiment of the present invention, the processor 131 may combine a plurality of primitives in a query to configure a composite primitive, generate and execute a binary code for the composite primitive in run time.

Figure 3:
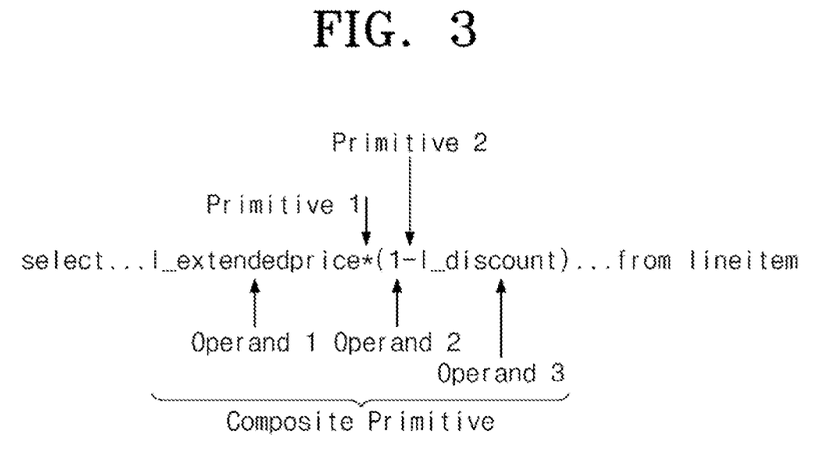
FIG. 3 is an exemplary query for explaining a query execution process according to an embodiment of the present invention.

FIG. 3 is an exemplary query for explaining a query execution process according to an embodiment of the present invention.

As shown in FIG. 3, the query executed by the processor 131 may include an expression that includes a plurality of operands and operators calculating them. In this example, the operator corresponds to a primitive that is the most basic unit in a programming language configuring a query.

Instead of individually generating and executing a binary code for each primitive in the query, an embodiment of the present invention may combine a plurality of primitives in the query to configure a composite primitive, then generate and execute the binary code for the composite primitive in run time to be capable of significantly increase a data processing speed.

According to an embodiment of the present invention, the composite primitive may include primitives including operators and operands operated by the operator.

Referring to FIG. 3, the composite primitive may include a first primitive corresponding to a multiplication operator, a second primitive corresponding to a subtraction operator, and first to third operands operated by these operators.

The operands are elements operated by operators and correspond to terms in an expression. According to an embodiment of the present invention, the operands may include a vector corresponding to a column in a table that forms a DB.

For example, the first and third operands in a query shown in FIG. 3 are vectors corresponding to columns "l_extendedprice" and "l_discount", respectively, in a DB table. However, the second operand is a constant and not a vector and does not correspond to a column.

Figure 4:
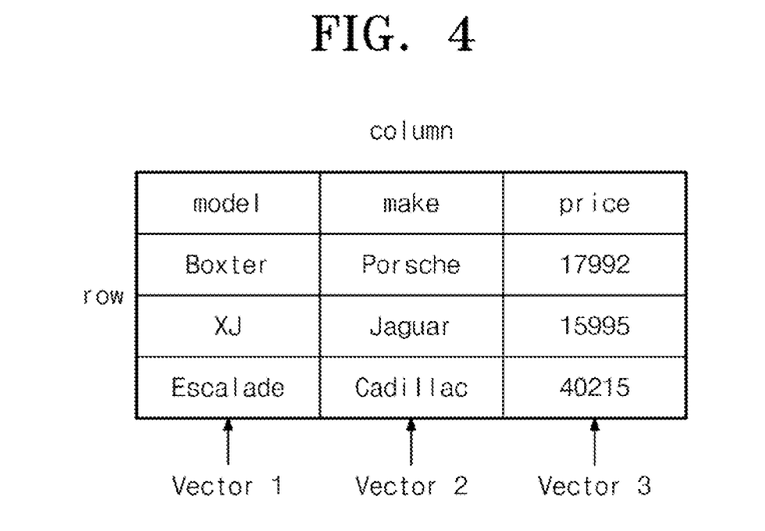
FIG. 4 is an exemplary data table for explaining a vector according to an embodiment of the present invention.

FIG. 4 is an exemplary data table for explaining a vector according to an embodiment of the present invention.

As shown in FIG. 4, the data stored in the second storage 133 is built as a DB such as a relational DB, and the DB includes one or more logical tables.

The table includes rows and columns, and each of the columns "model", "make" and "price" is handled as a vector to be used for executing a query.

According to an embodiment of the present invention, the processor 131 may obtain, based on at least one expression in the query, sub expressions configuring the expression, and general a plurality of sets of sub expressions required for completing the expression based on the sub expressions, determine among the plurality of sets of sub expressions, a set of sub expressions having the lowest cost that is calculated based on at least one of computation amount of sub expressions in the sets and the maximum number of columns used for operations, and configure each sub expression in a determined set of sub expressions as the composite primitive.

In other words, an embodiment of the present invention may combine sub expressions in an expression in a query to configure a plurality of sets, calculate a cost for the sets based on at least one of computation amount and the number of used columns and then determine a set having the lowest cost to configure each sub expression in a corresponding set as a composite primitive.

Figure 5:
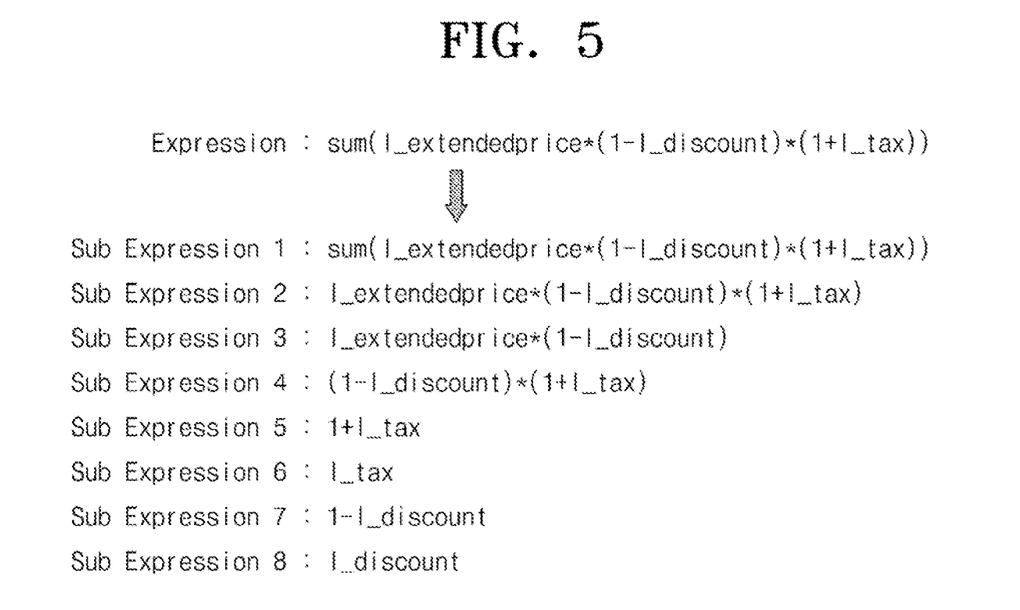
FIG. 5 is examples of an expression processed according to an embodiment of the present invention and sub expressions obtained therefrom.

FIG. 5 is examples of an expression processed according to an embodiment of the present invention and sub expressions obtained therefrom.

Firstly, the processor 131 may obtain sub expressions that configure, based on at least one expression in a query, the expression in order to configure a composite primitive from the query.

For example, when an expression in FIG. 5 is included in a query to be executed by the processor 131, the processor 131 may obtain a total of eight sub expressions from the expression.

According to an embodiment, the sub expression may include an operand corresponding to the column among operands in an expression, and a combination of operands and an operator operating the operands. For example, sub expressions 6 and 8 among sub expressions in FIG. 5 are operands "l_tax" and "l_discount", respectively, corresponding to columns, and sub expressions 1 to 5, and 7 are combinations of operands and operators operating the operands.

Then, the processor 131 may generate a plurality of sets of sub expressions that are required for completing an expression based on sub expressions.

According to an embodiment of the present invention, the processor 131 may generate identifiers for sub expressions configuring an expression, identifiers for other sub expressions in each sub expression, and component data for sub expressions of the expression based on the frequency with which each sub expression is represented in the expression.

For example, the processor 131 may generate, from sub expressions, a hash key corresponding thereto and then generate a has table having, as a value, a structure that includes (i) a sub expression; (ii) a list of hash keys of another sub expression in a corresponding sub expression; and (iii) the frequency with which the corresponding sub expression is represented in an expression. In this example, the other sub expression in a sub expression means another sub expression that configures a portion of any sub expression, and for example, sub expression 4 in FIG. includes sub expressions 5 to 8 as a portion.

Then, the processor 131 may generate expression component data that represents the inclusion relation between sub expressions configuring the expression, based on component data (e.g., a hash table) for the expression.

Figure 6:
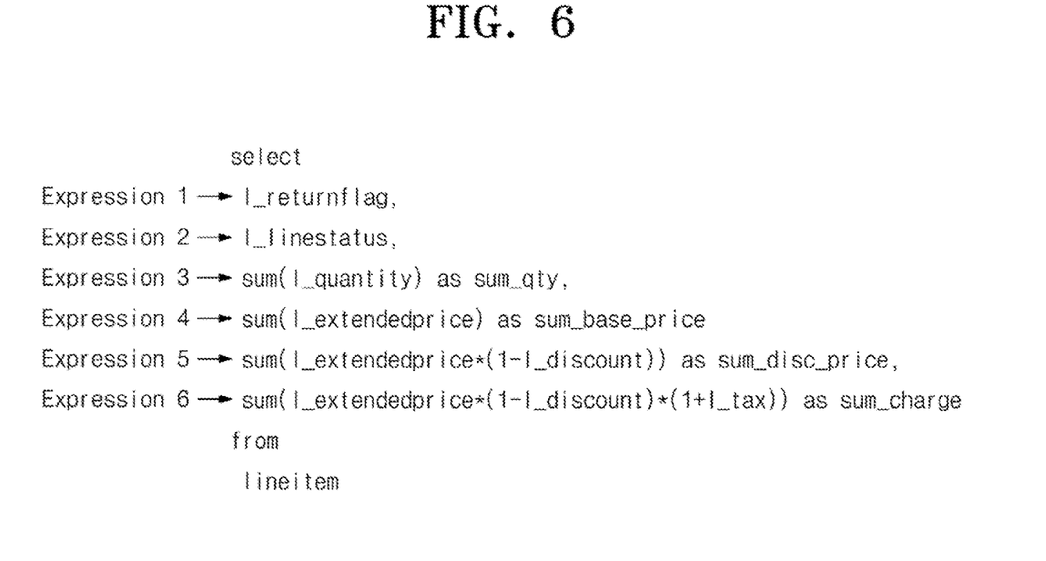
FIG. 6 is examples of a query executed according to an embodiment of the present invention and expressions included therein.

FIG. 6 is examples of a query executed according to an embodiment of the present invention and expressions therein.

For example, when the processor 131 executes a query as shown in FIG. 6, the processor 131 may obtain sub expressions configuring each expression from expressions 1 to 6 in the query and then generate a plurality of set of sub expressions required for completing at least one expression based on the sub expressions.

In this process, the processor 131 may generate a hash table for an expression as described previously, and may generate expression component data such as an inclusion relation diagram representing the inclusion relation between sub expressions configuring the expression based on the hash table.

Figure 7:
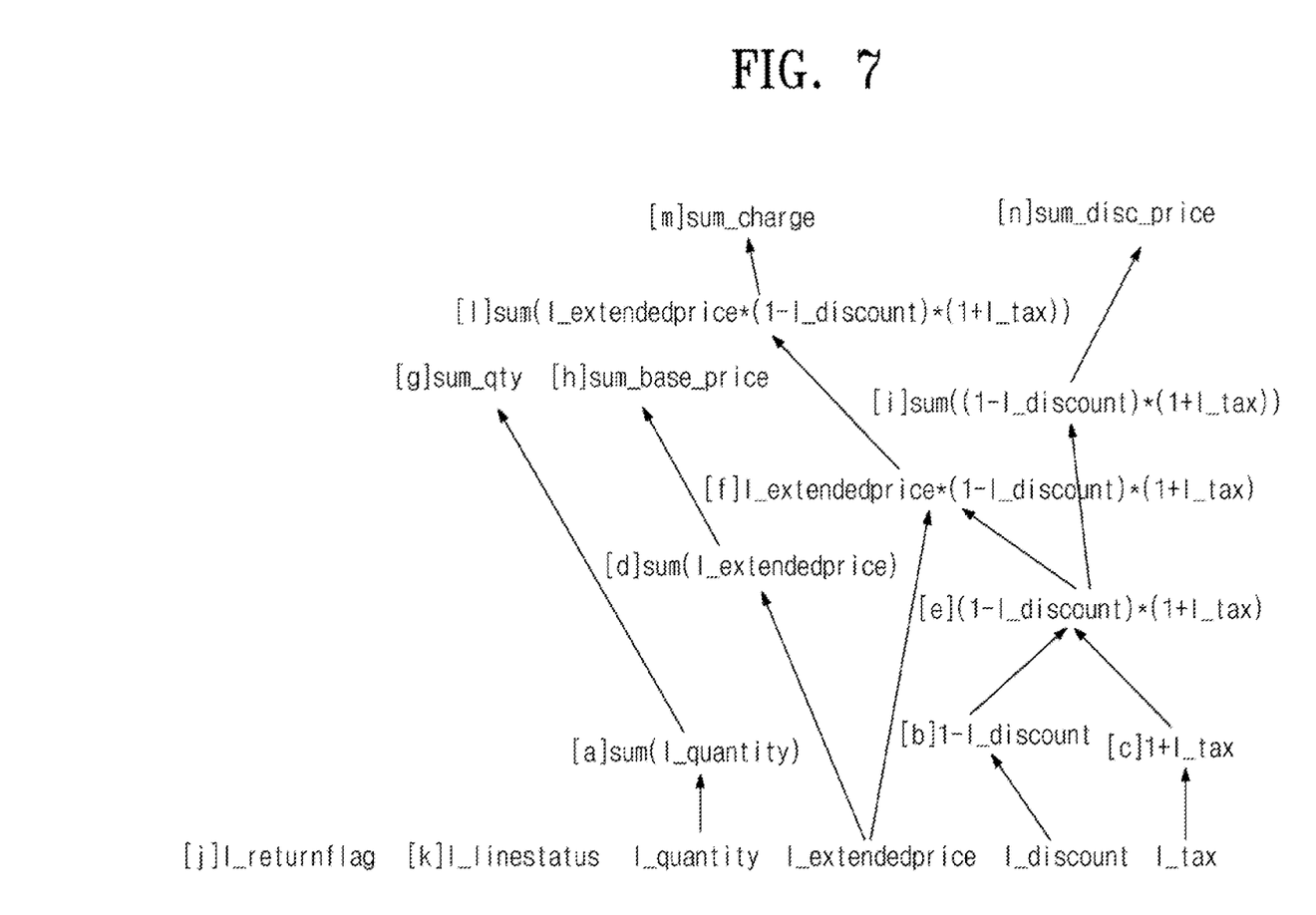
FIG. 7 is an exemplary inclusion relation diagram between sub expressions generated from a query of FIG. 6.

FIG. 7 is an exemplary inclusion relation diagram between sub equations generated from a query of FIG. 6.

As described previously, sub expressions may depend on one another in the process that each expression is divided into a plurality of sub expressions. In this example, when one sub expression s1 is included as a portion of another sub expression s2, it may be said that the sub expression s2 depends on the sub expression s1. Such dependency is described in (ii) a list of has keys of another sub expression in a corresponding sub expression in the hash table, and the processor 131 may generate the inclusion relation diagram between sub expressions based on such dependency.

For example, FIG. 7 that is the inclusion relation diagram between sub expressions may be generated from expressions 1 to 6 in a query of FIG. 6.

In the inclusion relation diagram of FIG. 7, expressions 1 to 6 correspond to [j], [k], [g], [h], [n] and [m], respectively and the inclusion relation diagram represents the dependency between sub expressions configuring each expression.

According to an embodiment of the present invention, the processor 131 may generate a plurality of sets of sub expressions required for completing at least one expression based on the dependency between sub expressions represented in the inclusion relation diagram.

For example, when only expressions [m] and [n] among expressions shown in FIG. 7 are considered, all sub expressions configuring the expressions [m] and [n] are [b], [c], [e], [f], [i] and [1]. A set of essential sub expressions required for completing the expressions [m] and [n] among the six sub expressions may be a set {i, 1} that has sub expressions [i] and [1] as elements, and may be a set {e, f, i, 1} that has sub expressions [e], [f], [i] and [1] as elements, as another set of sub expressions.

That is, the processor 131 may generate sets {i, 1} and {e, f, i, 1} as sets of sub expressions for completing the expressions [m] and [n] among expressions shown in FIG. 7.

Then, the processor 131 may determine a set of sub expressions having the lowest cost that is calculated based on at least one of computation amount of sub expressions in the sets and the maximum number of columns used for operations, as an optimal set of sub expressions, among the plurality of sets of sub expressions.

According to an embodiment of the present invention, the processor 131 may calculate, for each set of sub expressions, the computation amount of sub expressions in a corresponding set based on the total number of operators in sub expressions configuring the corresponding set.

According to an embodiment of the present invention, the processor 131 may obtain, for each set of sub expressions, the number of operands corresponding to a column that each sub expression in a corresponding set has, and may calculate, the maximum number of operands corresponding to the column for each sub expression, as the maximum number of columns used for operations of the corresponding set.

Figure 8:
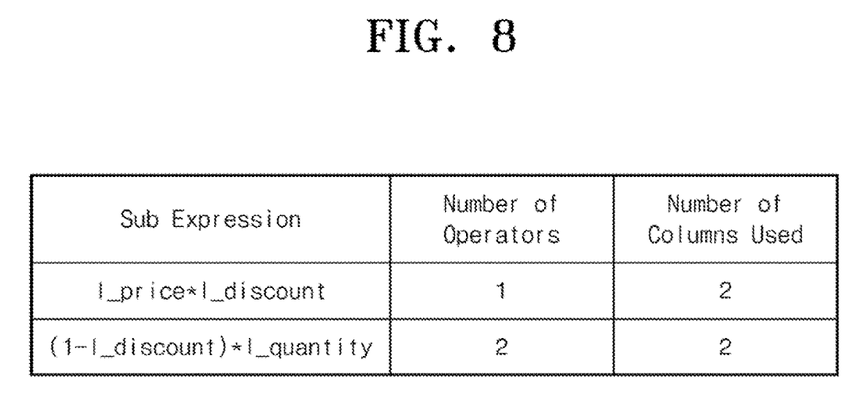
FIG. 8 is an exemplary diagram for explaining a process of calculating operations of sub expressions and the number of columns used for the operations according to an embodiment of the present invention.

FIG. 8 is an exemplary diagram for explaining a process of calculating computation amount of sub equations and the number of columns used for operations according to an embodiment of the present invention.

Referring to FIG. 8, in the case of sub expression "1_price*1_discount", the number of operators is one and the number of column operands "1_price" and "1_discount" used for that sub expression is two in total. In addition, in the case of sub expression "(1–1_discount)*1_quantity", the number of operators is two and the number of column operands "1_discount" and "1_quantity" used for that sub expression is two in total.

In this way, the processor 131 may obtain, for each of a plurality of sets of sub expressions of the expression, the total number of operators in sub expressions configuring a corresponding set, calculate the computation amount of sub expressions in the corresponding set, obtain the number of column operands that each sub expression in the corresponding set has, and calculate the maximum number of column operands for each sub expression as the maximum number of columns used for operations of the corresponding set.

Figure 9:
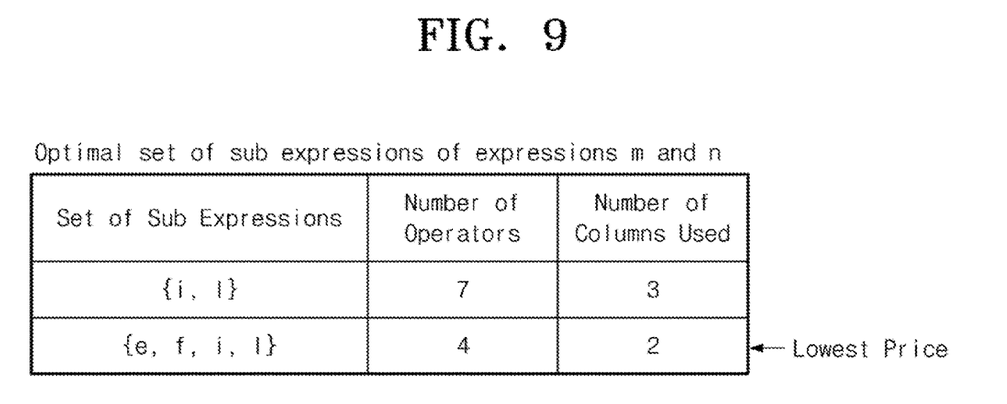
FIG. 9 is an exemplary diagram for explaining a process of determining an optimal set of sub expressions for expressions m and n in the inclusion relation diagram of FIG. 7.

FIG. 9 is an exemplary diagram for explaining a process of determining an optimal set of sub equations for expressions [m] and [n] in the inclusion relation diagram of FIG. 7.

Referring to FIG. 9, in the case of a set {i, 1} among sets of sub expressions of the expressions [m] and [n], the sub expression [i] includes a total of three operators and the sub expression [I] includes a total of four operators, so the set {i, I} has a total of seven operators.

In addition, in the case of a set {e, f, i, 1}, a sub expression [e] includes a total of three operator. A sub expression [f] originally includes four operators but when another sub expression [e] depending thereon in the set is used, it is possible to calculate with "1_extendedprice*[e]" and thus it is possible to operate with one operator. Likewise, when a sub expression [i] uses another sub expression [e] depending on thereon in the set, it is also possible to calculate without an operator, and when a sub expression [I] uses another sub expression [f] depending thereon in the set, it is also possible to calculate without an operator. Thus, the set {e, f, i, 1} needs a total of four operators for operation.

Also, in the case of a set {i, 1}, the sub expression [i] uses columns "1_discount" and "1_tax" for operations and thus includes a total of two column operands, and the sub expression [1] uses columns "1_extendedprice", "1_discount" and "1_tax" for operations and thus includes a total of three column operands. Thus, in the case of the set {i, I}, the maximum number of columns used for operations is three.

In addition, in the case of the set {e, f, i, 1}, the sub expression [e] uses columns "1_discount" and "1_tax" for operations and thus includes a total of two column operands. The sub expression [f] originally uses columns "1_extendedprice", "1_discount" and "1_tax" for operations but when another sub expression [e] depending thereon in the set is used, it is possible to calculate by using the columns "1_extendedprice" and "[e]" as operands and thus it is possible to calculate with a total of two column operands. Likewise, when the sub expression [i] uses another sub expression [e] depending thereon in the set, it is also possible to calculate by using the column "[e]" as an operand and thus it is possible to calculate with a total of one column operand, and when the sub expression [I] uses another sub expression [f] depending thereon in the set, it is also possible to calculate by using the column "[f]" as an operand and thus it is possible to calculate with a total of one column operand. Thus, in the case of the set {e, f, i, I}, the maximum number of columns used for operations is two.

According to an embodiment of the present invention, the processor 131 may calculate a cost for each set of sub expressions based on at least one of the total number of operators in the sub expressions and the maximum number of columns used for operations and it is possible to determine a set of sub expressions having the lowest cost as an optimal set of sub expressions. The cost may be a function that has the total number of the operators and the maximum number of the columns as variables, the cost may decrease as the total number of the operators decreases, and the cost may decrease as the maximum number of the columns decreases.

Referring to FIG. 9, since the set {e, f, i, 1} among sets of sub expressions for the expressions [m] and [n] is less than the set {i, 1} in the total number of operators and in the maximum number of columns used for operations, it may be determined as an optimal set of sub expressions.

According to an embodiment of the present invention, the processor 131 may select a set of sub expressions having the lowest computation amount (e.g., the total number of operators) among the plurality of sets of sub expressions and determine it as an optimal set of sub expressions. However, when there is a plurality of sets of sub expressions having the lowest computation amount, the processor 131 may select a set of sub expressions having the lowest maximum number of columns used for the operation among the plurality of sets of sub expressions having the lowest computation amount.

According to the present embodiment, when an optimal set of sub expressions of an expression is determined, the computation amount (e.g., the total number of operators in sub expressions) of sub expressions is preferentially considered and when the computation amount is the same, it is possible to determine based on the maximum number of columns used for the operation.

Then, the processor 131 may configure each sub expression in the optimal set of sub expressions as the composite primitive. For example, in the case of the set {e, f, i, 1} determined as an optimal set of sub expressions for the expressions [m] and [n] in FIG. 9, the sub expressions [e], [f], [i] and [1] may be configured as composite primitives 1 to 4.

According to an embodiment of the present invention, when the sub expressions configured as the composite primitive has a plurality of operands (i.e., column operands) corresponding to the columns, the processor 131 may handle columns corresponding to the plurality of operands as one vector and retrieves the columns together to the first storage 132 when the query is executed.

Referring to FIG. 7, the sub expression [e] has "1_discount" and "1_tax" as operands corresponding to columns and the processor 131 may combine two columns to be a structure and handle it as one vector. Then, the processor 131 may retrieves the two columns to the first storage 132 at a time and access them, when a query is executed.

As a result, when an operation is performed on the other sub expressions [f], [i] and [1] in an optimal set of sub expressions, the processor 131 may retrieves the columns "1_discount" and "1_tax" at a time and thus it is possible to further increase the utilization of the first storage 132.

Figure 10:
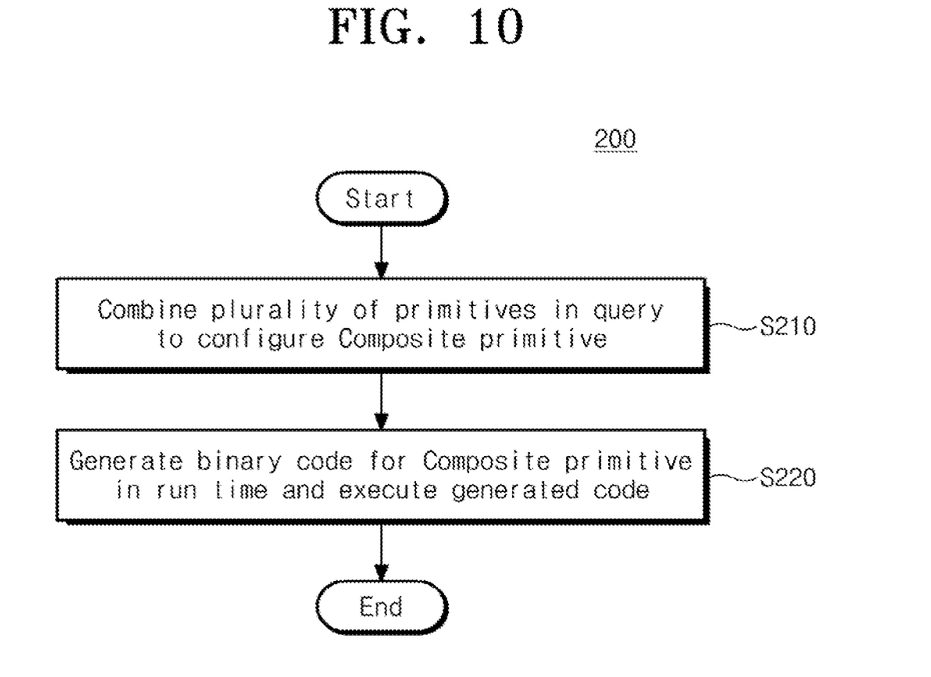
FIG. 10 is an exemplary flow chart of a method of executing a query according to an embodiment of the present invention.

FIG. 10 is an exemplary flow chart of a method 200 of executing a query according to an embodiment of the present invention.

The method 200 of executing the query may be performed in a worker module 130 according to an embodiment of the present invention.

Referring to FIG. 10, the method 200 of executing the query may include combining a plurality of primitives in a query to configure a composite primitive in step S210, and generating and executing a binary code for the composite primitive in run time in step S220.

The composite primitive may include primitives including operators and operands operated by the operators. The operands may include a vector corresponding to a column in a table that configures a DB built in a storage.

Figure 11:
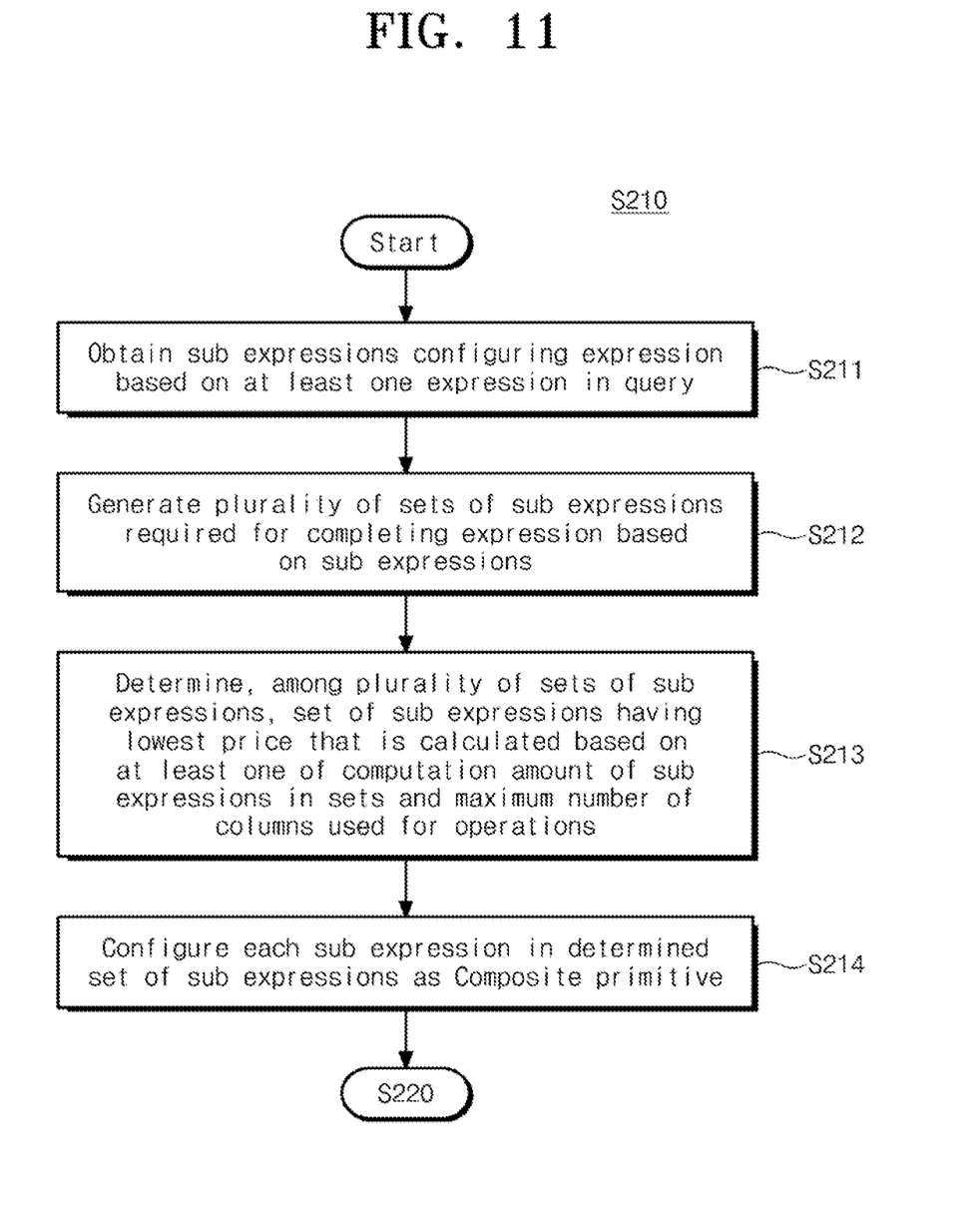
FIG. 11 is an exemplary flowchart of a process of configuring composite primitive according to an embodiment of the present invention.

FIG. 11 is an exemplary flowchart of a process of configuring a composite primitive according to an embodiment of the present invention.

As shown in FIG. 11, according to an embodiment of the present invention, the configuring the composite primitive in step S210 may include obtaining, based on at least one expression in a query, sub expressions configuring the expression in step S211, generating a plurality of sets of sub expressions required for completing the expression based on the sub expressions in step S212, determining a set of sub expressions having the lowest cost that is calculated based on the computation amount of sub expressions in a set and the maximum number of columns used for operations, among the plurality of sets of sub expressions in step S213, and configuring each sub expression in a determined set of sub expressions as a composite primitive in step S214.

The sub expressions may include operands corresponding to columns among operands in an expression (e.g., sub expressions 6 and 8 in FIG. 5), and a combination of the operands and operators operating them (e.g., sub expressions 1 to 5, and 7 in FIG. 5).

According to an embodiment of the present invention, generating the plurality of sets of sub expressions in step S212 may include generating identifiers for sub expressions configuring an expression, identifiers for other sub expressions in each sub expression, and component data (e.g., a hash table) for sub expressions of the expression based on the frequency with which each sub expression is represented in the expression.

Also, generating the plurality of sets of sub expressions in step S212 may include generating expression component data (e.g., an inclusion relation diagram) that represents the inclusion relation between sub expressions configuring the expression, based on the component data.

Figure 12:
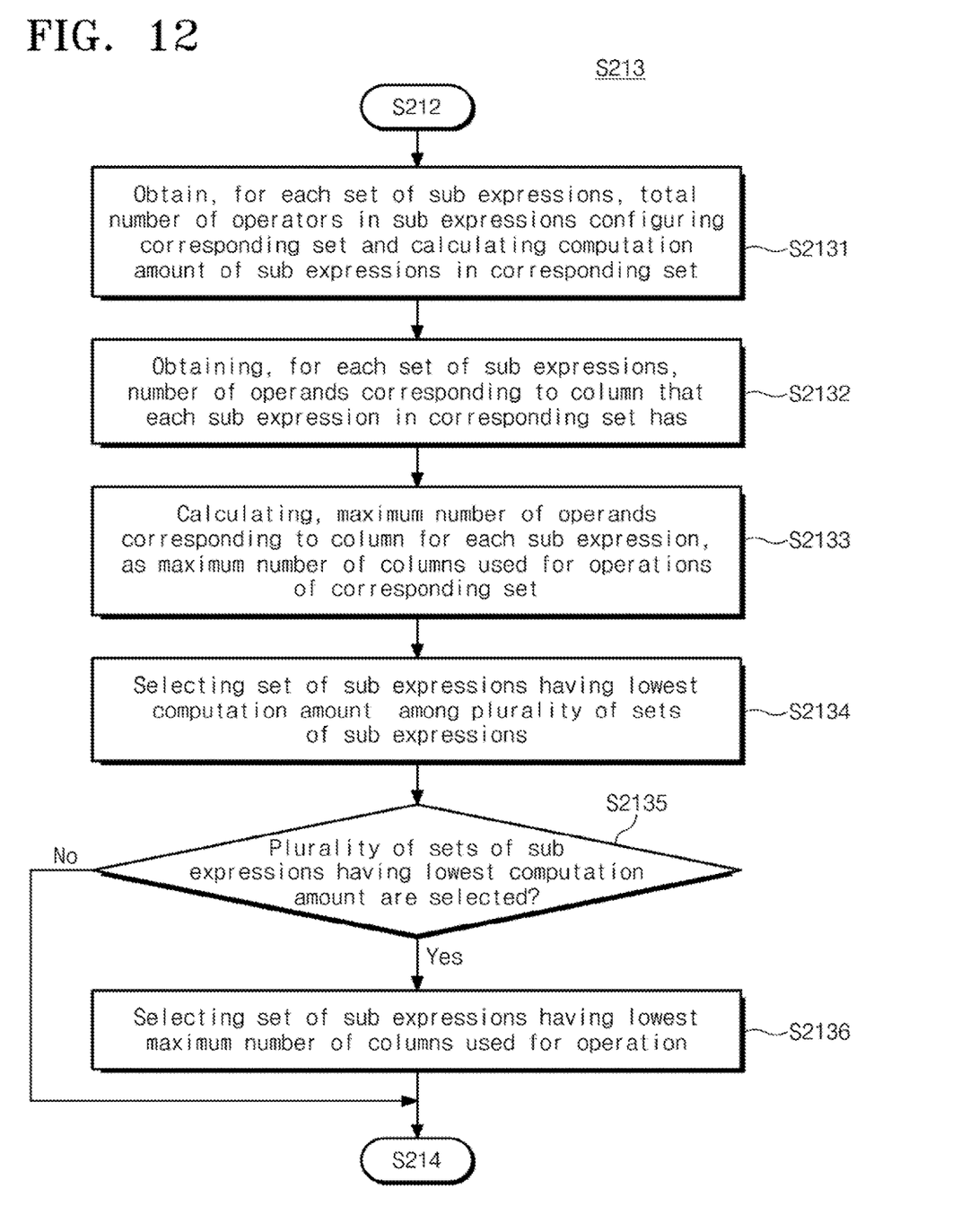
FIG. 12 is an exemplary flow chart of a process of determining an optimal set of sub expressions according to an embodiment of the present invention.

FIG. 12 is an exemplary flow chart of a process of determining an optimal set of sub equations according to an embodiment of the present invention.

According to an embodiment of the present invention, determining the set of sub expressions having the lowest cost in step S213 may include obtaining, for each set of sub expressions, the total number of operators in sub expressions configuring a corresponding set, and calculating the computation amount of sub expressions in the corresponding set in step S2131.

According to an embodiment, determining the set of sub expressions having the lowest cost in step S213 may include obtaining, for each set of sub expressions, the number of operands corresponding to columns (i.e., column operands) that each sub expression in the corresponding set has in step S2132, and calculating the maximum number of operands corresponding to the columns for each sub expression as the maximum number of columns used for operations of the corresponding set in step S2133.

According to an embodiment of the present invention, determining the set of sub expressions having the lowest cost in step S213 may include selecting a set of sub expressions having the lowest computation amount among the plurality of sets of sub expressions in step S2134, and selecting a set of sub expressions having the lowest maximum number of columns used for operations among a plurality of set of sub expressions having the lowest computation amount in step S2136 when the plurality of sets of sub expressions having the lowest computation amount is selected in step S2135, for example.

According to an embodiment of the present invention, subsequent to configuring the composite primitive in step S214, when the sub expressions configured as the composite primitive has a plurality of operands corresponding to the columns, the method 200 of executing the query may further include handling columns corresponding to the plurality of operands as one vector and taking the columns together to at least one of a register, a cache and a RAM when the query is executed.

The method 200 of executing the query according to an embodiment of the present invention as described above may be manufactured as a program to be executed on a computer and may be stored in a computer readable recording medium. The computer readable recording medium includes all kinds of storage devices that store data capable of being read by a computer system. Examples of the computer readable recording medium are a ROM, a RAM, a CD-ROM, a magnetic tape, a floppy disk, and an optical data storage device.

According to an embodiment of the present invention as described above, it is possible to increase a processing speed by increasing the utilization of hardware items such as a CPU, a cache, and a register. Also, by configuring a composite primitive and executing a query correspondingly, it is possible to decrease cache miss probability due to less primitive circulation compared with before.

According to an embodiment of the present invention, it is possible to increase a data processing speed in response to a query entered from a client.

According to an embodiment of the present invention, it is possible to increase the utilization of hardware items such as a CPU and a cache when a query is executed.

Although the present invention is described above through embodiments, the embodiments above are only provided to describe the spirit of the present invention and not intended to limit the present invention. A person skilled in the art will understand that various modifications to the above-described embodiments may be made. The scope of the present invention is defined only by the following claims.

What is claimed is:

1. A method of executing a query by a query execution apparatus comprising a processor and a storage, the method comprising:
   combining a plurality of primitives in a query to configure a composite primitive comprising:
      primitives comprising operators; and
      operands operated by the operators, wherein the operands comprise vectors corresponding to columns in a table that configures a database (DB) built in the storage; and
   obtaining, based on at least one expression in the query, sub expressions comprising:
      operands corresponding to columns, and
      a combination of the operands and operators;
   generating a plurality of sets of the sub expressions required for completing the expression based on the sub expressions;
   selecting, among the plurality of sets of the sub expressions, at least one set of the sub expressions having a lowest computation amount;
   if multiple sets of the sub expressions are selected:
      selecting a first set of the selected multiple sets of the sub expressions having a lowest number of columns;
   configuring each sub expression in a selected set of sub expressions having the lowest computation amount and having the lowest number of columns as the composite primitive;
   calculating the computation amount of the sub expressions in the selected set;
   designating a number of the operands corresponding to the column for each sub expression as a number of columns used for operations of the selected set; and
   retrieving the columns from the storage as one group when the query is executed, if the sub expression configured as the composite primitive has the plurality of operands corresponding to the columns.

2. The method of claim 1, wherein the lowest computation amount comprises a total number of operators and a maximum number of columns used for operations in the at least one set of the sub expressions.

3. The method of claim 1, wherein the plurality of sets of the sub expressions comprises identifiers for the sub expressions configuring the expression.

4. The method of claim 1, wherein the plurality of sets of the sub expressions comprises identifiers for other sub expressions in each sub expression.

5. The method of claim 1, wherein the plurality of sets of the sub expressions comprises component data for sub expressions of the expression.

6. The method of claim 5, wherein the component data comprises a frequency with which each sub expression is represented in the expression.

7. The method of claim 5, wherein the component data comprises a hash key for the sub expressions, a hash table having a sub expression and a list of hash keys of another sub expression.

8. The method of claim 1, wherein generating the plurality of sets of the sub expressions further comprises generating expression component data representing an inclusion relation between sub expressions configuring the expression based on a component data.

9. The method of claim 1, wherein a set of the sub expressions having the lowest computation amount is an optimal set having a lowest cost of the at least one set of the sub expressions.

10. The method of claim 9, wherein the optimal set is a function having a total number of operators and maximum number of columns as variables.

11. A computerized system for executing a query, comprising:
   at least one processor; and at least one storage comprising instructions that, when executed by the at least one processor, cause the at least one processor to perform steps comprising:
  combining a plurality of primitives in a query to configure a composite primitive comprising:
    primitives comprising operators; and
    operands operated by the operators, wherein the operands comprise vectors corresponding to columns in a table that configures a database (DB) built in the storage; and
  obtaining, based on at least one expression in the query, sub expressions comprising:
    operands corresponding to columns, and
    a combination of the operands and operators;
  generating a plurality of sets of the sub expressions required for completing the expression based on the sub expressions;
  selecting, among the plurality of sets of the sub expressions, at least one set of the sub expressions having a lowest computation amount;
  if multiple sets of the sub expressions are selected:
    selecting a first set of the selected multiple sets of the sub expressions having a lowest number of columns;
  configuring each sub expression in a selected set of sub expressions having the lowest computation amount and having the lowest number of columns as the composite primitive;
  calculating the computation amount of the sub expressions in the selected set;
  designating a number of the operands corresponding to the column for each sub expression as a number of columns used for operations of the selected set; and
  retrieving the columns from the storage as one group when the query is executed, if the sub expression configured as the composite primitive has the plurality of operands corresponding to the columns.

12. The computerized system of claim 11, wherein the lowest computation amount comprises a total number of operators and a maximum number of columns used for operations in the at least one set of the sub expressions.

13. The computerized system of claim 11, wherein the plurality of sets of the sub expressions comprises identifiers for the sub expressions configuring an expression.

14. The computerized system of claim 11, wherein the plurality of sets of the sub expressions comprises identifiers for other sub expressions in each sub expression.

15. The computerized system of claim 11, wherein the plurality of sets of the sub expressions comprises component data for sub expressions of the expression.

16. The computerized system of claim 15, wherein the component data comprises a frequency with which each sub expression is represented in the expression.

17. The computerized system of claim 15, wherein the component data comprises a hash key for the sub expressions, a hash table having a sub expression and a list of hash keys of another sub expression.

18. The computerized system of claim 11, wherein generating the plurality of sets of the sub expressions further comprises generating expression component data representing an inclusion relation between sub expressions configuring the expression based on a component data.

19. The computerized system of claim 11, wherein a set of the sub expressions having the lowest computation amount is an optimal set that is a function having a total number of operators and maximum number of columns as variables.

* * * * *